United States Patent
Costa

Patent Number: 5,934,141
Date of Patent: Aug. 10, 1999

[54] TWO-AXIS CARTESIAN ROBOT

[76] Inventor: Larry J. Costa, 54201 Ash Rd., Osceola, Ind. 46561

[21] Appl. No.: 08/899,681

[22] Filed: Jul. 24, 1997

[51] Int. Cl.⁶ .............................. B25J 9/02; F16H 19/04; F16H 3/44
[52] U.S. Cl. .................. 74/89.17; 74/490.03; 74/490.09; 475/286; 475/295; 901/16; 901/23; 901/25
[58] Field of Search ................................... 74/89.17, 422, 74/490.03, 490.09; 475/286, 295; 901/16, 23, 25

[56] References Cited

U.S. PATENT DOCUMENTS

| | | | |
|---|---|---|---|
| 3,972,280 | 8/1976 | Swatik et al. | 475/286 X |
| 4,132,318 | 1/1979 | Wang et al. | 901/16 X |
| 4,600,358 | 7/1986 | Graf | 901/16 X |
| 5,476,358 | 12/1995 | Costa | 414/749 |
| 5,533,858 | 7/1996 | Costa | 414/751 |

Primary Examiner—Allan D. Herrmann
Attorney, Agent, or Firm—Zarley, McKee, Thomte Voorhees & Sease; Dennis L. Thomte

[57] ABSTRACT

A two-axis Cartesian robot comprising a vertically disposed Y-axis support having a traverse carriage selectively vertically movably mounted thereon. An X-axis support is movably mounted on the carriage. A reversible drive motor is mounted on the carriage and has a driven shaft extending therefrom upon which is mounted a planetary gear drive including an X-axis drive gear and a Y-axis drive gear which are in engagement with gear racks on the X-axis and Y-axis supports, respectively. A Y-axis brake is provided for selective engagement with the Y-axis drive gear for selectively preventing rotation of the Y-axis drive gear and an X-axis brake is provided for selective engagement with the X-axis drive gear for selectively preventing rotation of the X-axis drive gear. A workpiece manipulator is secured to the X-axis support for movement therewith.

4 Claims, 6 Drawing Sheets

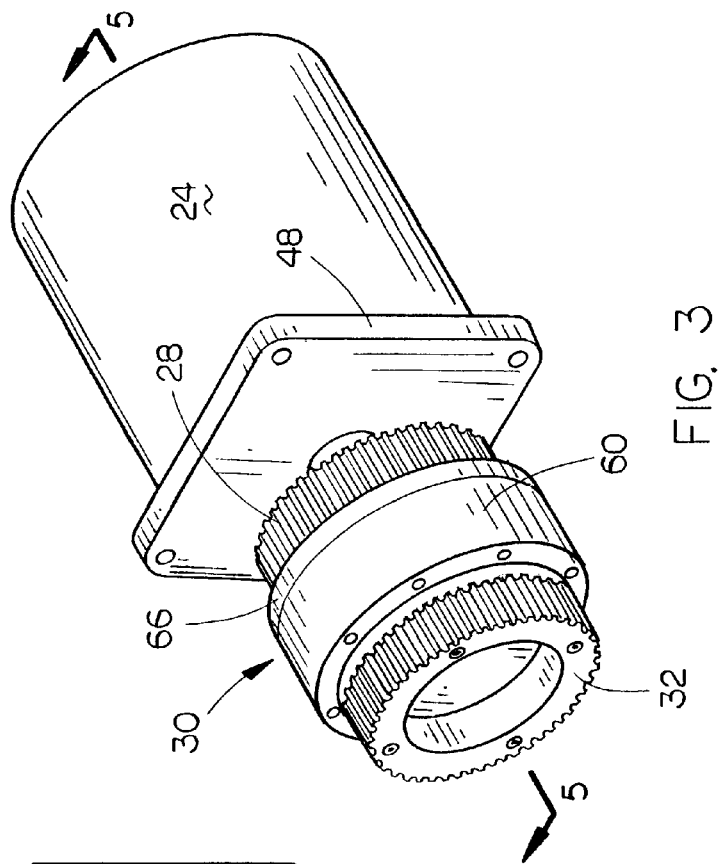
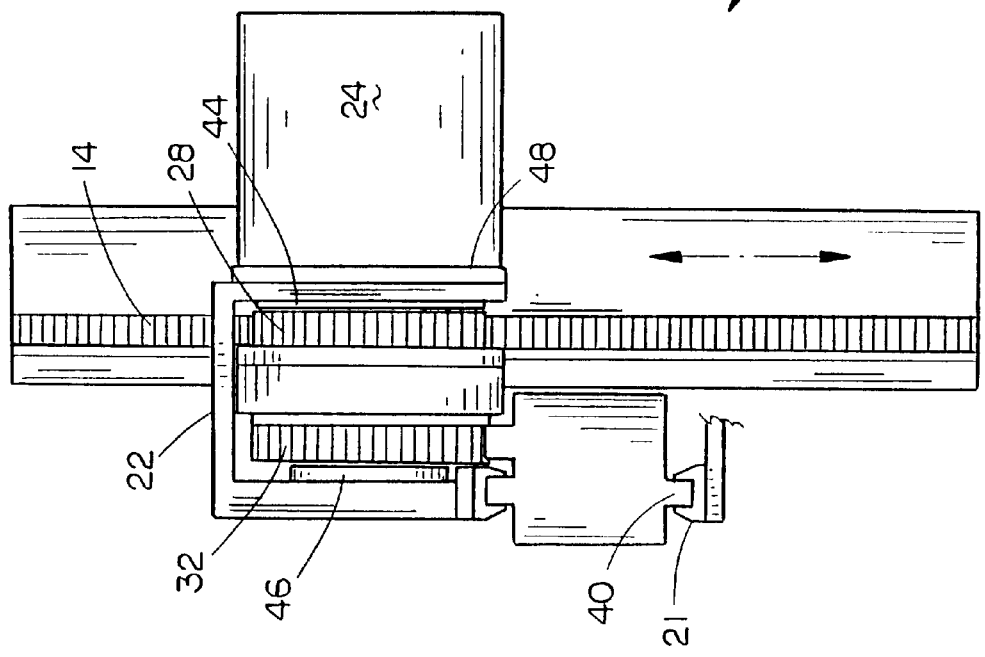

TWO-AXIS CARTESIAN ROBOT

BACKGROUND OF THE INVENTION

1. Field of the Invention

This invention relates to a Cartesian robot and more particularly to a two-axis Cartesian robot.

2. Description of the Prior Art

Many types of robotic designs have been previously provided, but they all suffer from one or more shortcomings. To the best of applicant's knowledge, other than the robots described in U.S. Pat. No. 5,476,358; U.S. Pat. No. 5,324,163; and U.S. Pat. No. 5,533,858, the prior Cartesian robot devices require one drive motor for each axis of movement. Although the robotic designs disclosed in applicant's earlier patents did represent a significant advance in the art, it is believed that the instant invention likewise achieves significant advances over applicant's earlier devices.

SUMMARY OF THE INVENTION

A two-axis Cartesian robot is described which includes a single drive motor for driving the robot in two directions of movement, namely, the Y and X axes.

The robot of this invention includes a vertically disposed Y-axis support having an elongated gear rack at one side thereof and an elongated linear bearing rail at another side thereof. A traverse carriage is vertically movably mounted on the Y-axis bearing rail and a motor mount is provided on the traverse carriage for movement therewith. The traverse carriage has an X-axis bearing block provided thereon which movably supports an elongated and substantially horizontally disposed X-axis support. The X-axis support has an elongated X-axis gear rack provided thereon positioned between the ends thereof. A drive motor is mounted on the motor mount and has a driven shaft extending horizontally therefrom which is operatively received by a planetary gear drive reducer. The planetary gear drive reducer includes an X-axis drive pinion and a Y-axis drive pinion. A Y-axis brake is provided for selective engagement with the Y-axis drive pinion for selectively preventing rotation of the Y-axis drive pinion. An X-axis brake is provided for selective engagement with the X-axis drive pinion for selectively preventing rotation of the X-axis drive pinion. A workpiece manipulating apparatus is operatively secured to the X-axis support. By selectively controlling the Y-axis and X-axis brakes, the workpiece manipulating apparatus may be vertically and horizontally moved into the desired position through the use of a single drive motor and planetary gear apparatus.

It is therefore a principal object of the invention to provide a two-axis Cartesian robot design.

Yet another object of the invention is to provide a two-axis Cartesian robot requiring only a single drive motor.

Still another object of the invention is to provide a two-axis Cartesian robot which achieves movement of a workpiece manipulating apparatus through a planetary gear arrangement, thereby eliminating the need for belts, chains, cables, etc.

Still another object of the invention is to provide a two-axis Cartesian robot which is economical in manufacture, durable in use and refined in appearance.

These and other objects will be apparent to those skilled in the art.

BRIEF DESCRIPTION OF THE DRAWINGS

FIG. 2 is a side view of the robot of this invention;

FIG. 3 is a perspective view of the drive motor and planetary gear arrangement;

DESCRIPTION OF THE PREFERRED EMBODIMENT

Figure 1:
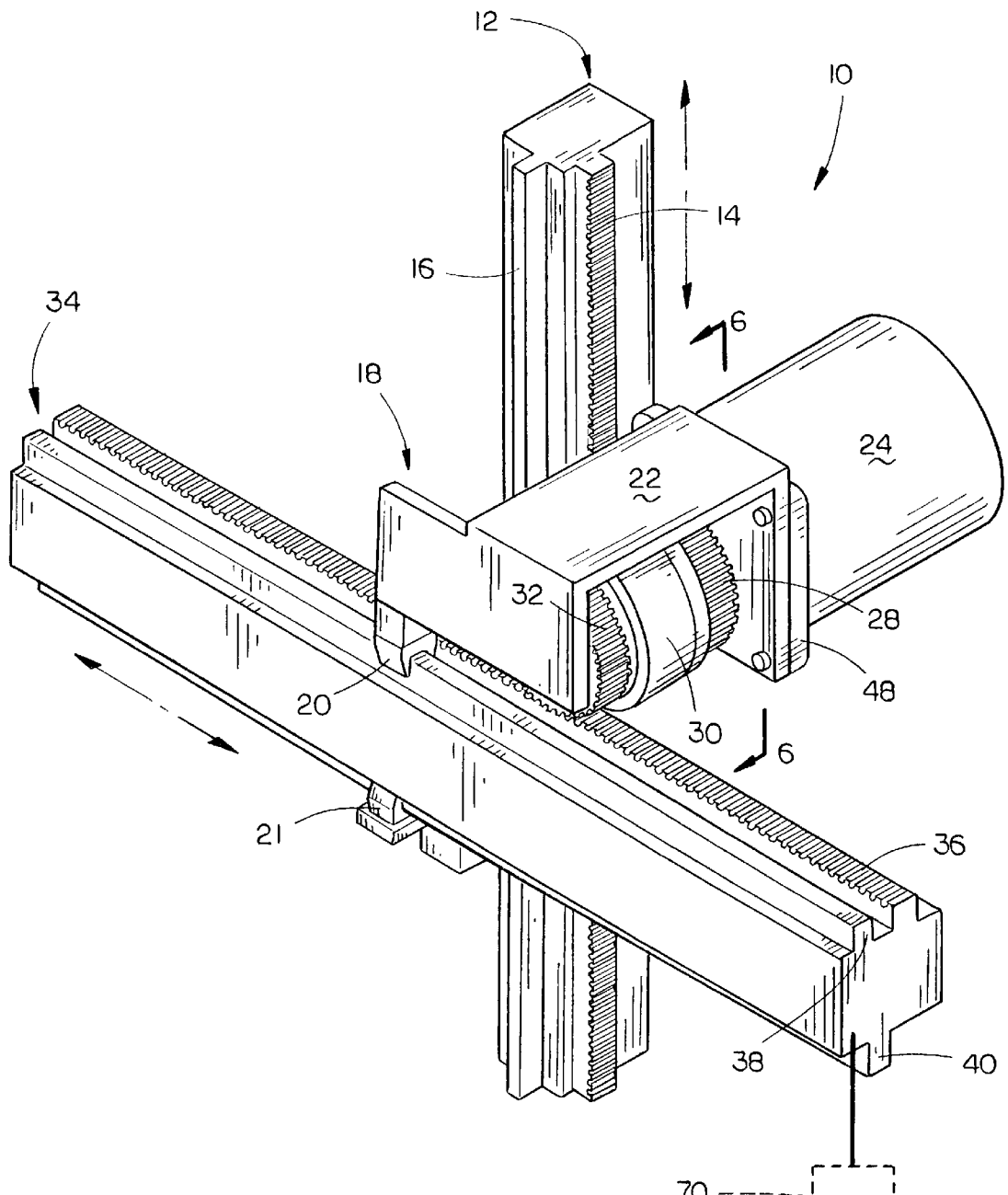
FIG. 1 is a perspective view of the robot of this invention.
Figure 4:
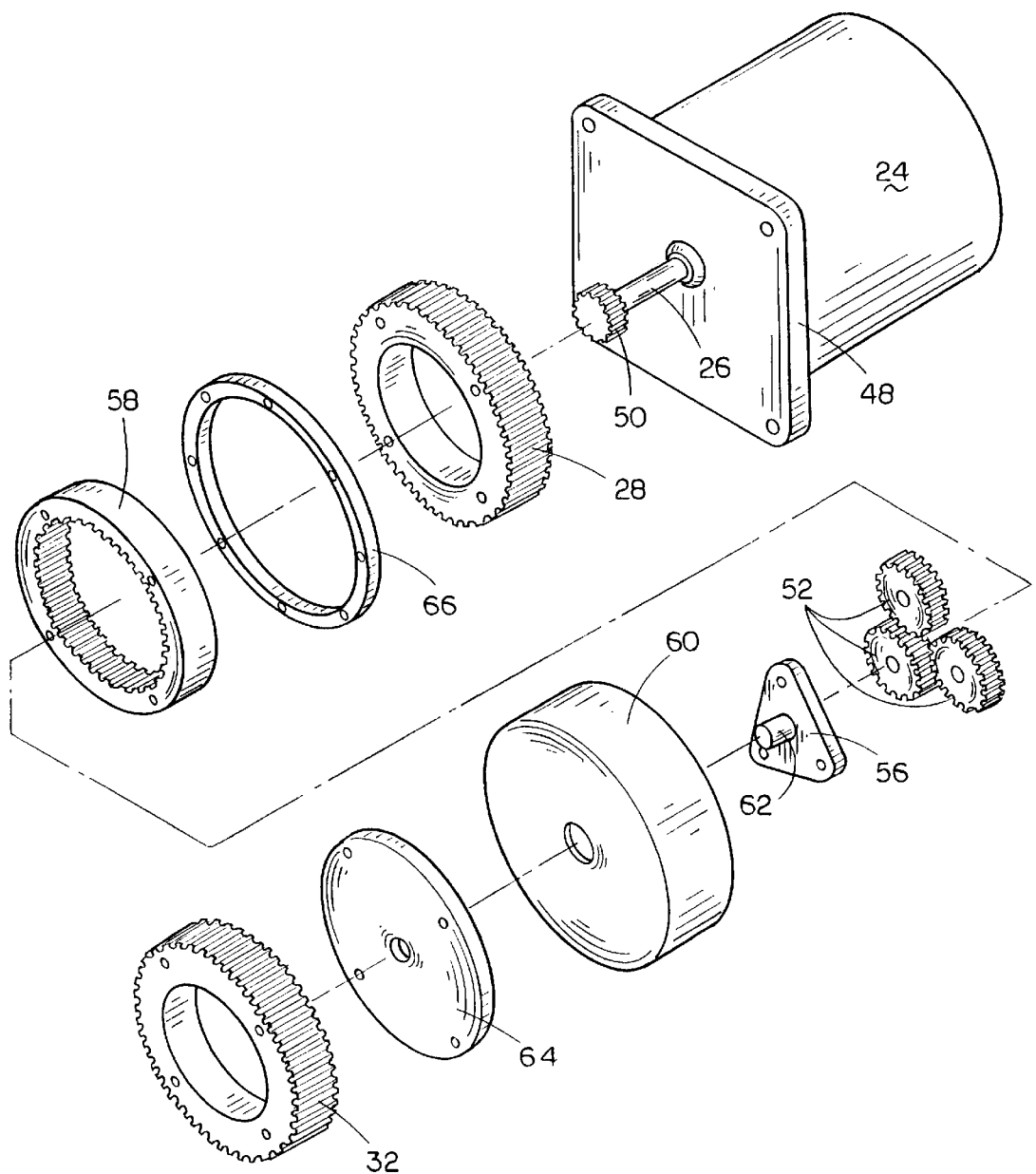
FIG. 4 is an exploded perspective view of the planetary gear arrangement.
Figure 5:
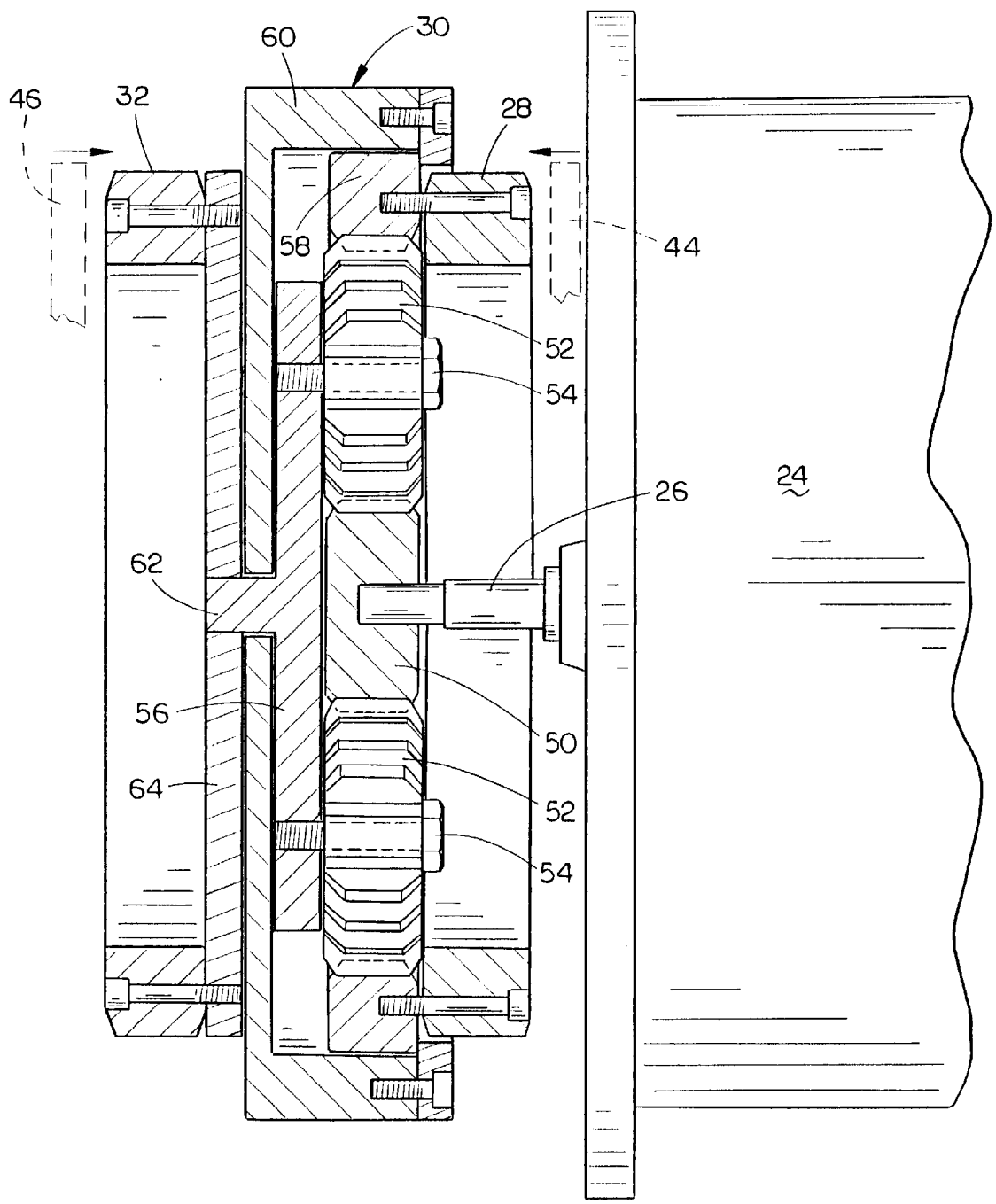
FIG. 5 is a sectional view of the planetary gear assembly.
Figure 6:
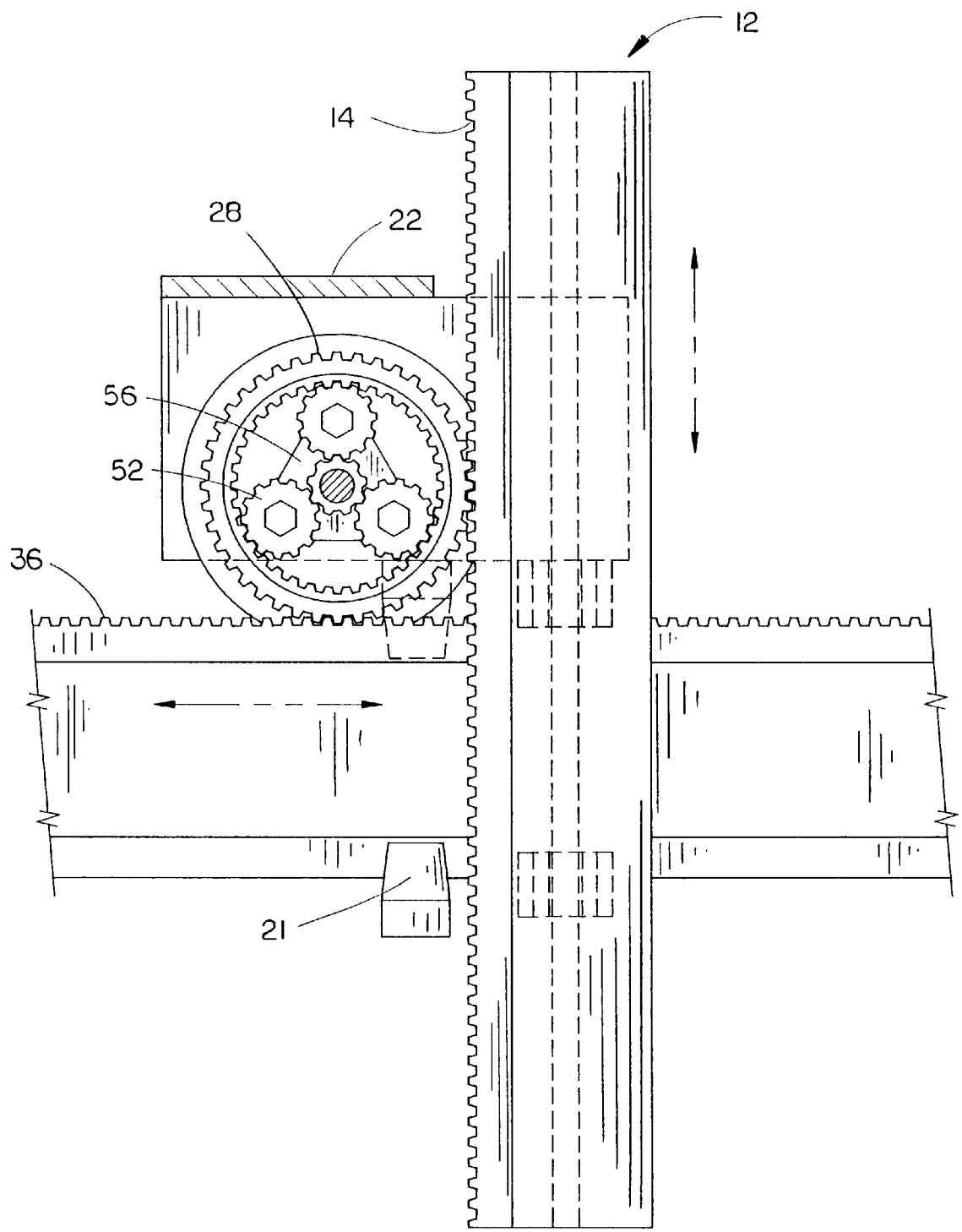
FIG. 6 is a side elevational view of the robot of this invention with portions thereof cut away to more fully illustrate the invention.
Figure 8:
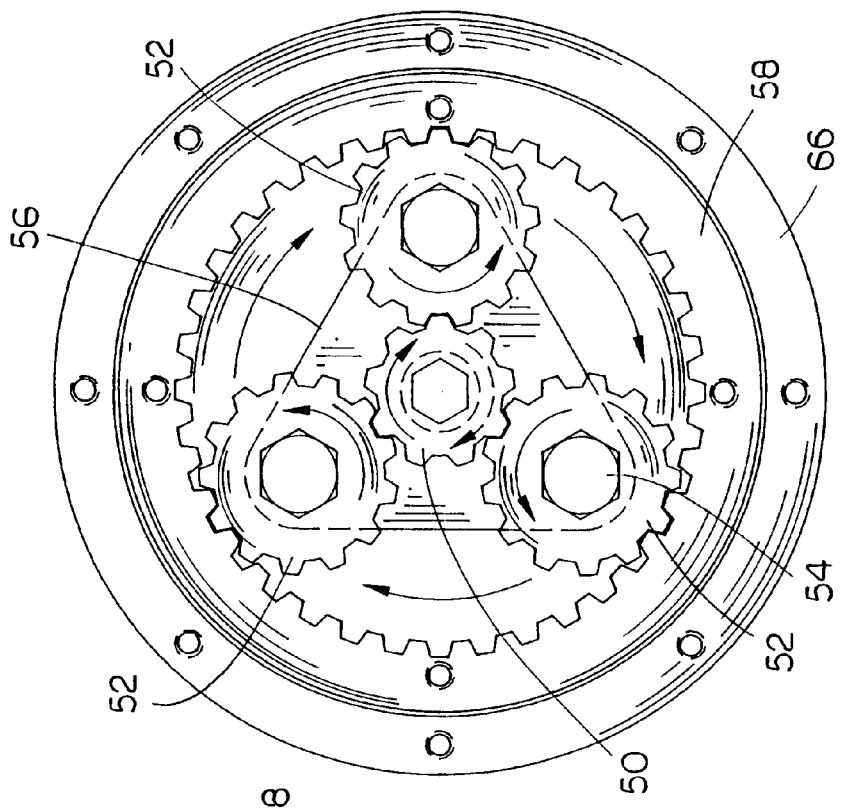
FIG. 8 is a view similar to FIG. 7 except that the fixed gear is locked or braked into position.
Figure 7:
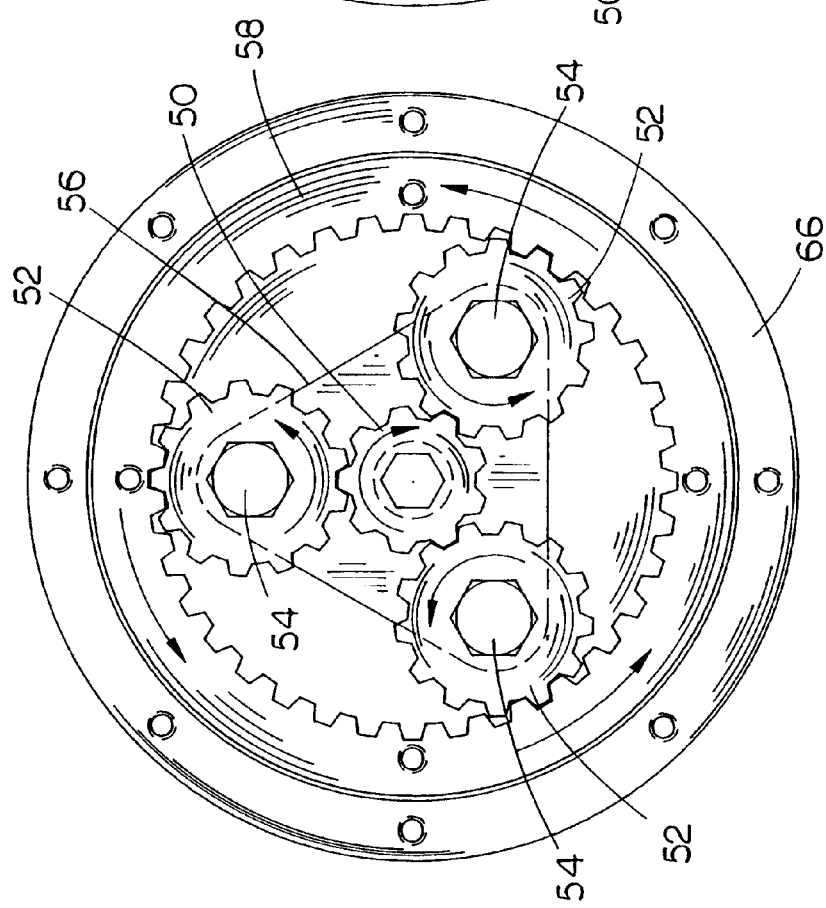
FIG. 7 is a sectional view of the planetary gear assembly.

Referring to FIG. 1, the numeral 10 refers generally to the two-axis Cartesian robot of this invention. Robot 10 includes a Y-axis support 12 which is vertically disposed and which has upper and lower ends. As seen in the drawings, a Y-axis gear rack 14 is provided at one side of the support 12 and a Y-axis linear bearing rail 16 is provided on the support 12 on a support thereof adjacent to gear rack 14.

The numeral 18 refers to a traverse carriage which is vertically movably mounted on the Y-axis support 12. Carriage 18 is provided with X-axis linear bearing blocks 20 and 21. The numeral 22 refers to a motor mount which is secured to carriage 18 for movement therewith and which is designed to support drive motor 24. Drive motor 24 includes a driven shaft 26 which is operatively connected to Y-axis drive pinion 28, planetary gear reducer housing 30, and X-axis drive pinion 32, the details of which will be described in more detail hereinafter. As seen in the drawings, Y-axis drive pinion 28 is in mesh with the Y-axis gear rack 14.

The numeral 34 designates an X-axis support including an X-axis gear rack 36 and X-axis linear bearing rails 38 and 40. X-axis gear rack 36 is in mesh with X-axis drive pinion 32 and the X-axis linear bearing rails 38 and 40 are received by the X-axis linear bearing blocks 20 and 21 provided on carriage 18. The numeral 44 refers to a Y-axis brake while the numeral 46 refers to an X-axis brake. The brakes 44 and 46 are conventional in design and are adapted to selectively prevent the rotation of Y-axis drive pinion 28 and X-axis drive pinion 32, respectively, as will be described in more detail hereinafter.

Drive motor 24 includes a mounting flange 48 to mount the motor 24 on the carriage 18. The output shaft 26 of motor 24 extends inwardly into the rotatable reducer housing 30 and has a drive pinion gear 50 mounted thereon for rotation therewith. Drive pinion gear 50 is in mesh with a plurality of follower gears 52 rotatably mounted on axles 54. Axles 54 are secured to the follower carrier 56 which is positioned outwardly of the follower gears 52.

Follower gears 52 are in mesh with and received by a fixed gear 58 which is positioned in the reducer housing 60 of the reducer 30. Reducer output shaft 62 is secured to the follower carrier 56 and is operatively connected to a reducer output flange 64 which is operatively connected to the X-axis pinion drive gear 32. Reducer housing 60 has its input end enclosed by an input cover 66 which is operatively secured to the Y-axis pinion drive gear 28. Y-axis brake 44 is selectively movable into engagement with the Y-axis drive pinion 28 to selectively prevent the rotation thereof. X-axis brake 46 is selectively movable into engagement with the X-axis drive pinion 32 to prevent the rotation thereof at times.

The robot of this invention provides for sequential motion of multiple axes with only a single drive motor 24. The single drive motor 24 is located on the traversing carriage 18 with the Y-axis being the base element and the X-axis being equipped with a work-holding manipulator at either of its ends. The work-holding manipulator is referred to in schematic form by the reference numeral 70. Each of the Y and X-axes are held stationary by the conventional brakes previously described. Only one axis brake is released at a time to permit the drive motor to move the released axis. To hold the X-axis and Y-axis stationary, both the X-axis brake 46 and the Y-axis brake 44 are engaged. The Y-axis brake 44 engages the Y-axis drive pinion 28 to prevent rotation thereof. The X-axis brake 46 engages the X-axis drive pinion 32 to hold the same in position.

To transmit power to the X-axis, the X-axis brake 46 is released which permits power to be transmitted by the drive motor 24 to the X-axis drive pinion 32 that is engaged into the X-axis gear rack 36 so that the X-axis member 34 moves horizontally with respect to carriage 18. The direction of movement of the X-axis member 34 depends upon the rotation of the reversible drive motor 24. In other words, rotation of the motor 24 in one direction will cause the X-axis member 34 to move in one direction and the reverse rotation of the motor 24 will cause the X-axis member 34 to move in an opposite direction.

To alternatively transmit power to the Y-axis, only the Y-axis brake 44 is released which permits power to be transmitted by the drive motor 24 to the Y-axis drive pinion 28 which is engaged into the Y-axis gear rack 14, thereby causing the carriage 18 to move upwardly or downwardly with respect to the Y-axis member 12 depending upon the direction of rotation of the power shaft 26 by the motor 24.

More specifically, to transmit power to the Y-axis member 12, power is transmitted to the drive pinion gear 28 which causes the follower gears 52 to rotate on their follower gear axles 54, because the follower carrier 56 is secured by the X-axis brake 46. The rotation of the follower gears 52 on their axles 54 drives the fixed gear 58 which is attached to the reducer housing 60.

Thus it can be seen that the robot of this invention permits movement of the work-holding manipulator along the Y and X-axes with only a single drive motor and without the need for cables, belts, etc.

Thus it can be seen that the invention accomplishes at least all of its stated objectives.

I claim:

1. A two-axis Cartesian robot, comprising:

a first elongated and substantially vertically disposed Y-axis support having upper and lower ends;

said support having an elongated Y-axis bearing rail provided thereon positioned between the upper and lower ends thereof;

said Y-axis support having an elongated Y-axis gear rack thereon positioned between the upper and lower ends thereof;

a traverse carriage vertically movably mounted on said Y-axis bearing rail;

a motor mount provided on said traverse carriage for movement therewith;

said traverse carriage having an X-axis bearing block provided thereon;

an elongated and substantially horizontally disposed X-axis support movably mounted on said X-axis bearing block and having first and second ends;

said X-axis support having an elongated X-axis gear rack thereon positioned between said first and second ends thereof;

a drive motor mounted on said motor mount and having a driven shaft extending horizontally therefrom;

a planetary gear drive reducer;

said reducer including a reducer housing having inner and outer ends;

said reducer also including a drive pinion gear positioned in said reducer housing which is secured to said drive motor driven shaft;

a plurality of follower gears in said reducer housing in engagement with said drive pinion gear and having axles upon which they rotate;

said follower gears having inner and outer sides;

a follower carrier positioned in said reducer housing at the outer sides of said follower gears;

said axles being connected to said follower carrier;

said reducer including a fixed gear positioned therein which is in mesh with said follower gears;

said follower carrier having an output shaft secured thereto;

an X-axis drive pinion operatively connected to said output shaft for rotation therewith;

said X-axis drive pinion being in operative engagement with said X-axis gear rack;

a Y-axis drive pinion operatively connected to said fixed gear for rotation therewith;

said Y-axis drive pinion being in operative engagement with said Y-axis gear rack;

a Y-axis brake for selective engagement with said Y-axis drive pinion for selectively preventing rotation of said Y-axis drive pinion;

an X-axis brake for selective engagement with said X-axis drive pinion for selectively preventing rotation of said X-axis drive pinion;

and a workpiece manipulating apparatus operatively secured to said X-axis support.

2. A two-axis Cartesian robot, comprising:

a first elongated and substantially vertically disposed Y-axis support having upper and lower ends;

said Y-axis support having an elongated Y-axis gear rack thereon positioned between the upper and lower ends thereof;

a traverse carriage selectively vertically movably mounted on said Y-axis support;

an elongated and substantially horizontally disposed X-axis support movably mounted on said carriage and having first and second ends;

said X-axis support having an elongated X-axis gear rack thereon positioned between said first and second ends thereof;

a drive motor mounted on said carriage and having a driven shaft extending horizontally therefrom;

a planetary gear drive assembly driven by said drive motor and including an X-axis drive gear and a Y-axis drive gear;

said X-axis drive gear being in engagement with said X-axis gear rack;

said Y-axis drive gear being in engagement with said Y-axis gear rack;

a Y-axis brake for selective engagement with said Y-axis drive gear for selectively preventing rotation of said Y-axis drive gear;

an X-axis brake for selective engagement with said X-axis drive gear for selectively preventing rotation of said X-axis drive gear;

and a workpiece manipulating apparatus operatively secured to said X-axis support for movement therewith.

3. A two-axis Cartesian robot, comprising:

a first elongated and substantially vertically disposed Y-axis support having upper and lower ends;

said Y-axis support having an elongated Y-axis gear rack thereon positioned between the upper and lower ends thereof;

a traverse carriage vertically movably mounted on said Y-axis support;

said traverse carriage having an X-axis bearing block provided thereon;

an elongated and substantially horizontally disposed X-axis support movably mounted on said carriage and having first and second ends;

said X-axis support having an elongated X-axis gear rack thereon positioned between said first and second ends thereof;

a drive motor mounted on said carriage and having a driven shaft extending horizontally therefrom;

a planetary gear drive reducer;

said reducer including a reducer housing having inner and outer ends;

said reducer also including a drive pinion gear positioned in said reducer housing which is secured to said drive motor driven shaft;

a plurality of follower gears in said reducer housing in engagement with said drive pinion gear and having axles upon which they rotate;

said follower gears having inner and outer sides;

a follower carrier positioned in said reducer housing at the outer sides of said follower gears;

said axles being connected to said follower carrier;

said reducer including a fixed gear positioned therein which is in mesh with said follower gears;

said follower carrier having an output shaft secured thereto;

an X-axis drive pinion operatively connected to said output shaft for rotation therewith;

said X-axis drive pinion being in operative engagement with said X-axis gear rack;

a Y-axis drive pinion operatively connected to said fixed gear for rotation therewith;

said Y-axis drive pinion being in operative engagement with said Y-axis gear rack;

a Y-axis brake for selective engagement with said Y-axis drive pinion for selectively preventing rotation of said Y-axis drive pinion;

an X-axis brake for selective engagement with said X-axis drive pinion for selectively preventing rotation of said X-axis drive pinion;

and a workpiece manipulating apparatus operatively secured to said X-axis support for movement therewith.

4. A two-axis Cartesian robot, comprising:

a first elongated and substantially vertically disposed Y-axis support having upper and lower ends;

said Y-axis support having an elongated Y-axis gear rack thereon positioned between the upper and lower ends thereof;

a traverse carriage selectively vertically movably mounted on said Y-axis support;

an elongated and substantially horizontally disposed X-axis support movably mounted on said carriage and having first and second ends;

said X-axis support having an elongated X-axis gear rack thereon positioned between said first and second ends thereof;

a drive motor mounted on said carriage and having a driven shaft extending horizontally therefrom;

a planetary gear drive assembly driven by said drive motor and including an X-axis drive gear and a Y-axis drive gear;

said X-axis drive gear being in engagement with said X-axis gear rack;

said Y-axis drive gear being in engagement with said Y-axis gear rack;

a Y-axis brake for selectively preventing rotation of said Y-axis drive gear;

an X-axis brake for selectively preventing rotation of said X-axis drive gear;

and a workpiece manipulating apparatus operatively secured to said X-axis support for movement therewith.

* * * * *